United States Patent

Weiss

[11] Patent Number: 5,301,769
[45] Date of Patent: Apr. 12, 1994

[54] VEHICLE POWER DISTRIBUTION AND CONTROL SYSTEM

[75] Inventor: Heinz Weiss, Bensheim, Fed. Rep. of Germany

[73] Assignee: Deere & Company, Moline, Ill.

[21] Appl. No.: 7,450

[22] Filed: Jan. 22, 1993

[30] Foreign Application Priority Data

Jan. 25, 1992 [DE] Fed. Rep. of Germany ........ 4202026

[51] Int. Cl.$^5$ .............................................. B60K 17/344
[52] U.S. Cl. .................................. 180/249; 364/424.1
[58] Field of Search ............... 180/249, 248, 233, 197; 364/424.1

[56] References Cited

U.S. PATENT DOCUMENTS

| | | | |
|---|---|---|---|
| 4,669,559 | 6/1987 | Fukui | 180/6.24 |
| 4,776,424 | 10/1988 | Naito | 180/233 |
| 4,825,368 | 4/1989 | Itoh et al. | 364/424.1 |
| 4,895,217 | 1/1990 | Huckler et al. | 180/233 |
| 5,070,961 | 12/1991 | Tezuka | 180/249 |
| 5,099,944 | 3/1992 | Kageyama et al. | 180/249 |

FOREIGN PATENT DOCUMENTS 3427725 8/1985 Fed. Rep. of Germany .

Primary Examiner—Margaret A. Focarino
Assistant Examiner—Kevin Hurley

[57] ABSTRACT

A vehicle power distribution and control system controls and distributes the power supplied to the wheels of a motor vehicle with at least two driven axles. One of the axles includes an axle differential gear. The control system includes a steering angle sensor, rotational speed sensors to monitor the rotational speeds of the wheels of at least one axle, and an electronic control unit. A differential lock for the axle differential gear is controlled by the control unit to equalize sliding effects that can occur between the wheels of one axle. The control unit calculates a theoretical rotational speed difference ratio from the value of the sensed steering angle for conditions of rolling without any slip and an actual rotational speed difference ratio from the sensed rotational speed values. The control unit compares the two rotational speed difference ratios with each other in predetermined time intervals and transmits control signals to the axle differential locks to increase the degree of locking of the axle differential lock when the actual rotational speed difference ratio is greater than the theoretical rotational speed difference ratio, and to reduce the degree of locking when the actual rotational speed difference ratio is smaller than the theoretical rotational speed difference ratio.

8 Claims, 3 Drawing Sheets

VEHICLE POWER DISTRIBUTION AND CONTROL SYSTEM

BACKGROUND OF THE INVENTION

The invention relates to a control system for the control and distribution of power to the wheels of a motor vehicle, such as an agricultural tractor.

A known control system for the control and distribution of power to the wheels of a vehicle with all-wheel drive is described in German Patent No. DE 34 08 991 C2. In order to reduce the radius of the turning circle this control system includes a shift arrangement which automatically raises the wheel speed of the front wheels upon exceeding a predetermined steering angle of the front wheels so that their circumferential speed is two to three times as high as that of the rear wheels. Furthermore, at high vehicle speeds the all-wheel drive is automatically shifted to a two-wheel drive. The abrupt changes in the distribution of the power supply to the individual wheels that occur in this shift, however, impairs the stability of steering and safety.

To improve the steering stability and avoid skidding of the vehicle, German Patent No. DE 36 26 025 C2 proposes to control the distribution of the power supply to the front and rear wheels when slippage occurs. For this purpose the vehicle speed, the circumferential speed of the wheels and the turning circle radius are detected. The latter corresponds to the steering angle of the front wheels. See also, for example, German patent No. DE 34 27 725 C2. These values are used to generate a control signal corresponding to the desired drive torque which is used to control a distribution clutch in order to apply the desired drive torque to the rear wheels. However, this drive arrangement does not permit equalizing slippage that can occur between the wheels of an axle.

SUMMARY OF THE INVENTION

Accordingly, an object of this invention is to provide a control system of the aforementioned type by means of which the problems noted above can be overcome and that makes it possible for all wheels of a vehicle to participate in steering, driving and braking forces of the vehicle and to avoid any loss of traction.

A further object of the invention is to provide such a control system wherein permanent driving force is maintained for all wheels of the vehicle during operation, such as field operation, as well as during transport over the road, independent of the fact that the vehicle is operating in a straight line or in a curve.

Another object of the invention is to provide such a control system wherein the driving force is divided among the individual wheels, even those on one axle, corresponding to the propulsion requirements and/or the driving conditions.

These and other objects are achieved by the present invention, wherein at least one of the axles, but preferably each of the axles of the vehicle, is provided with an axle differential gear with an axle differential lock that can be controlled by a control system. The measured values of the steering angle are used by the control system to determine a theoretical rotational speed difference ratio for conditions of rolling without any slip and determines an actual rotational speed difference ratio from the measured values of the rotational speed sensors. The rotational speed difference ratios are defined as the absolute value of the difference of the circumferential speeds of the two wheels on one axle divided by the mean value of the circumferential speeds of the two wheels of one axle.

The control system compares the actual with the theoretical rotational speed difference ratio in predetermined time intervals and transmits control signals to the axle differential lock. The control signals increase the degree of locking of the axle differential lock when the actual rotational speed difference ratio $SDR_{act}$ is greater than the theoretical rotational speed difference ratio $SDR_{req}$, and reduce the degree of locking when the actual rotational speed difference ratio $SDR_{act}$ is smaller than the theoretical rotational speed difference ratio $SDR_{req}$. This means that when an excessively high rotational speed difference between the two wheels of one axle is encountered, it is reduced by braking the differential action and that when too small a rotational speed difference is found, the rotational speed is equalized by increasing the differential action.

The theoretical circumferential speeds can be derived from the vehicle geometry and the steering angle for pure rolling of the wheels without any slip. In a typical Ackerman type steering mechanism, the wheel centerlines of the front and the rear wheels may meet at a point on the extension of the centerline of the rear axle, as long as alignment errors are disregarded. In actual operation the performance of the vehicle deviates more or less from the theoretical ideal condition due to weather conditions, road conditions, loading of the vehicle, tire pressures, vehicle speeds, operation around curves and abrupt driving maneuvers, etc. Since the operator can control the vehicle essentially with the steering wheel, which responds directly to the actions of the operator as well as the reaction of the vehicle, the steering angle is a key parameter for the steering process.

The solution according to the invention has the advantage that all wheels can interact with the steering, driving and braking forces of the vehicle corresponding to their loading, the present conditions of the ground, etc. Even under poor driving conditions optimum driving safety can be assured, in particular on the road, since the interaction of the operator and the vehicle with respect to steering, accelerations and braking is controlled by modulated locking or releasing of the front and rear axle differential gear and/or the center differential gear. The control is preferably performed by an electronic control that responds to rapid changes in the conditions between the wheel and the ground. All wheels of the vehicle can remain permanently driven during productive operation, such as operation in the field, as well as during transport operation on the road or in operation around curves. It is not necessary to separate one of the axles from the driveline for certain operating conditions.

By correctly balancing the load on the vehicle and by maintaining the required tire pressures the effect of the measures according to the invention on the vehicle can be improved.

Preferably, the control system calculates the theoretical rotational speed difference ratio from the absolute value of the effective rolling radii $R_l$ and $R_r$ of the wheel divided by the rolling radius $R_m$ of a mean equivalent wheel according to the following relationship, $SDR_{req} = |R_l - R_r| \div R_m$.

Thereby the mean equivalent wheel may be defined by the Ackermann conditions. The aforementioned radii can be derived for each given vehicle geometry from simple geometric relationships from the measured values of the steering angles.

Also, a further improvement of the operating behavior results from the control of the differential action of a center differential gear arranged between a driven non-steerable axle and a driven steerable axle.

The control system calculates from the measured values of the steering angles a radius ratio that consists of the rolling radius of a mean equivalent wheel of the steerable axle divided by the rolling radius of a mean equivalent wheel of the rigid axle. The control system also derives from the measured rolling speeds of the wheels for each axle a mean rotational speed, and calculates a speed ratio from the mean rotational speed of the steerable axle divided by the mean rotational speed of the rigid axle. As long as the rotational speed ratio is greater than the radius ratio, the control system transmits control signals to a center differential lock that increase the degree of locking of the center differential gear. Once the rotational speed ratio becomes smaller than the radius ratio, the degree of locking of the center differential gear is reduced. This means that when the wheels of one axle slip, the center differential gear is locked to a greater degree. If, on the other hand, the wheels of one of the axles operate synchronously the differential action is increased.

Preferably, the differential locks contain hydraulically operated clutches or brakes through which the degree of locking can be controlled. The clutches or brakes can be controlled by electro-magnetically operated hydraulic valves, which receive electric control signals from the control unit. The axle differential gears can be designed in such a way that they are opened when no pressure is applied and can be closed by hydraulic pressure against the force of a spring, while the center differential gear is closed when no pressure is applied and can be opened by hydraulic pressure against the force of a spring. In case of failure of the electrical and/or hydraulic circuits, the drive arrangement reverts to its initial mechanical configuration so as to avoid critical operating conditions.

Since the wheels of the steerable axle exhibit a higher circumferential speed in operation around curves than the speed of the wheels of the rigid axle, a preferred embodiment of the invention proposes increasing the circumferential speed of the wheels of the steerable axle in proportion to the steering angle. This is accomplished by dividing the gearbox output power between the rigid axle and the steerable axle by means of the center differential gear in proportion to the steering angle in such a way that an automatic increase in the rotational speed of the wheels of the steerable axle as compared to the rotational speed of the wheels of the rigid axle is produced during operation around curves.

The increase in rotational speed can preferably be performed constantly by the application of a Ravigneaux gear-set contained in the center differential gear through which the gearbox output torque is divided between the drives to the steerable axle and the rigid axle in proportion to the radii of the two sun gears of the Ravigneaux gear-set. To avoid repetition, copending patent application Ser. No. 07/929,645 filed 12 Aug. 1992 is hereby incorporated by reference.

Alternatively, the speed of the steerable wheels can be increased or decreased incrementally, in comparison with that of the wheels of the rigid axle with increasing steering angle by the use of a so-called dual-speed gearbox to drive the steerable axle. The steerable axle can be shifted into the driveline by the dual-speed gearbox. Furthermore, the drive can be shifted between two speeds. The shift points of the dual-speed gearbox are established by the predetermined steering angles and other conditions. While the center differential gear is continuously variable, the dual-speed gearbox operates in clearly defined steps controlled by shifting. Here the differential action is enhanced by a controlled pressure or slip at the gearbox brake.

Preferably, the temperature of each differential lock is sensed. When predetermined temperature limits are exceeded, the control system transmits control signals to the differential locks, which are automatically closed or opened fully, so that the clutches and brakes no longer slip and generate frictional heat.

To improve braking action a brake sensor is provided, and the control system transmits control signals to lock the center differential lock upon actuation of a vehicle brake.

DETAILED DESCRIPTION

Figure 1:
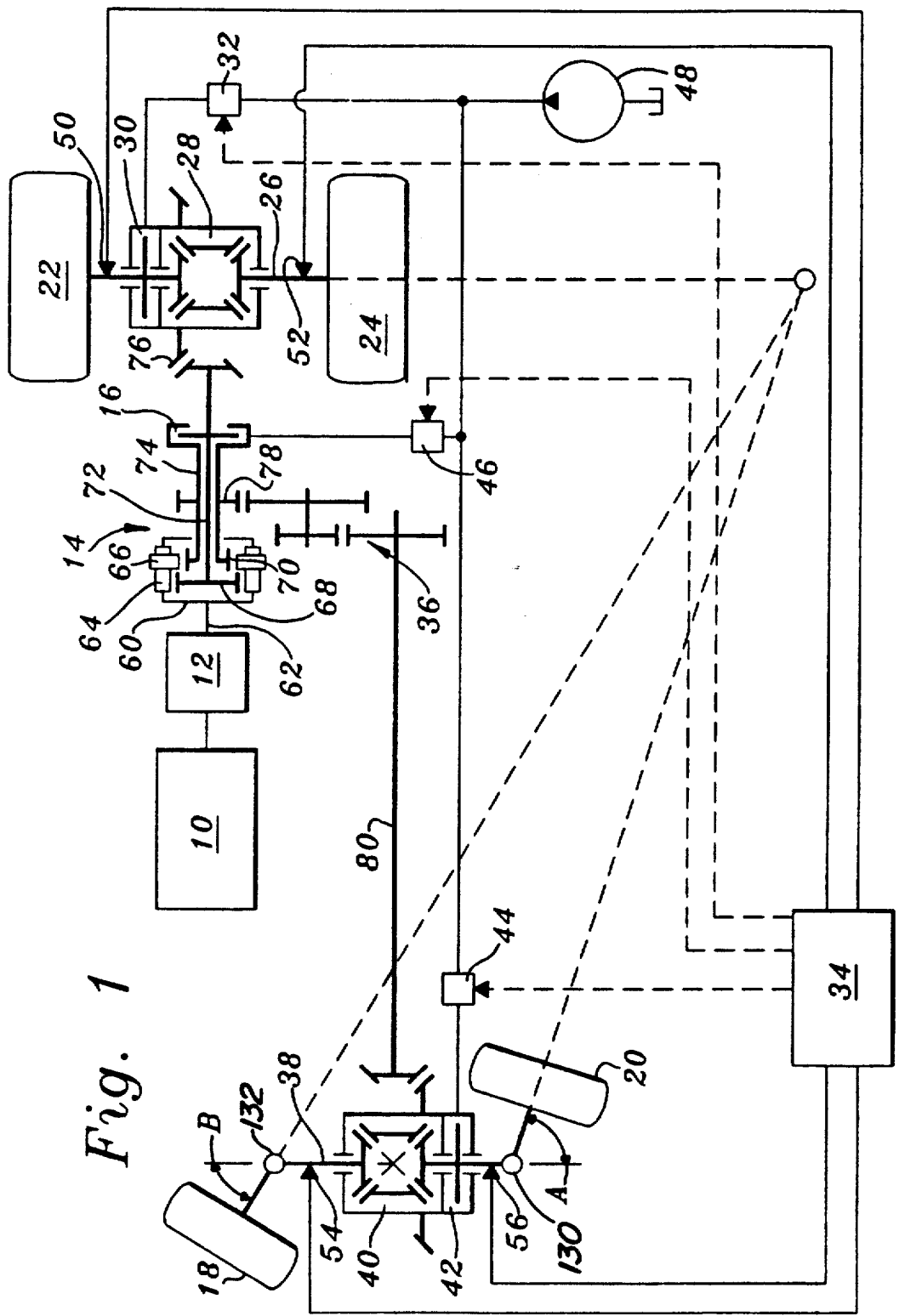
FIG. 1 is a schematic diagram of the power distribution and control system of the present invention.

Referring to FIG. 1, there is shown a power distribution and control system for an all-wheel drive vehicle. An engine 10 drives a gearbox 12 whose output is connected to a center differential gear 14. The differential action of the center differential gear 14 can be controlled by a center differential lock 16. This divides the engine torque as modified by the gearbox 12 in a fixed torque ratio between the front wheels 18, 20 and the rear wheels 22, 24.

A first power distribution branch leads to the rear axle 26 with a rear axle differential gear 28 with an associated rear axle differential lock 30. The rear axle differential lock 30 is controlled through an electro-hydraulic valve 32 by an electronic control system 34.

The other power distribution branch transmits power through intermediate gears 36 to the driven front axle 38 with a front axle differential gear 40 which is associated with a front axle differential lock 42. The front axle differential lock 42 is also controlled through an electro-hydraulic valve 44 by the electronic control system 34.

The electronic control system 34 also transmits control signals to a further electro-hydraulic valve 46 which controls the center differential lock 16. All valves 32, 44, 46 are supplied with hydraulic pressure by a pump 48.

Rotational speed sensors 50, 52, 54, 56 are attached to the rear axle 26 and the front axle 38 and measure the rotational speeds of the two rear wheels 22, 24 as well as that of the two front wheels 18, 20. The measured values of the rotational speed are transmitted to the electronic control system 34. Two steering angle sensors, 130 and 132 not described in any further detail, sense the steering angles (A and B) of the front wheels 18, 20 and transmit the measured values to the electronic control system 34.

The center differential gear 14 is preferably configured as a Ravigneaux gear-set whose planet carrier 60 is attached, fixed against rotation, to the gearbox output shaft 62. A set of long planet pinions 64 and a set of short planet pinions 66 are arranged on the planet carrier 60. Each set of planet pinions may, for example, consist of three pinions, of which, however, only one pinion 64, 66 in each case is shown.

Furthermore, the Ravigneaux gear-set contains two sun gears 68, 70 that are attached to coaxial output shafts 72, 74 extending from the Ravigneaux gear-set. The long planet pinions 64 mesh with the larger sun gear 68 and the shorter planet pinions 66 mesh with the smaller sun gear 70. Furthermore, each of the long planet pinions 64 meshes with one of the short planet pinions 66.

With the planet carrier 60 at rest, if, for example, the larger sun gear 68 is rotated, the other, smaller sun gear 70 is driven in the opposite direction of rotation through the long planet pinions 64 and the short planet pinions 66. At the same time, there is an increase in the rotational speed corresponding to the diameter ratio of the two sun gears 68, 70. This operating characteristic of the Ravigneaux gear-set makes possible its application as a differential gear.

When the Ravigneaux gear-set is driven through its planet carrier 60, the torque is divided between the output shaft 72, 74 of the two sun gears 68, 70 corresponding to the diameter ratio of the two sun gears 68, 70. The output shaft 72 of the larger sun gear 68 is connected to the bevel gear 76 of the rear axle differential gear 28. The output shaft 74 of the smaller sun gear 70 is configured as a hollow shaft that surrounds the output shaft 72. It carries a gear 78 which drives the front axle differential gear 40 through the intermediate gears 36 and the front drive shaft 80.

The two output shafts 72, 74 can be connected to each other by the center differential lock 16 configured as a clutch, so that the differential action of the Ravigneaux gear-set can be suppressed completely or partially.

Figure 2:
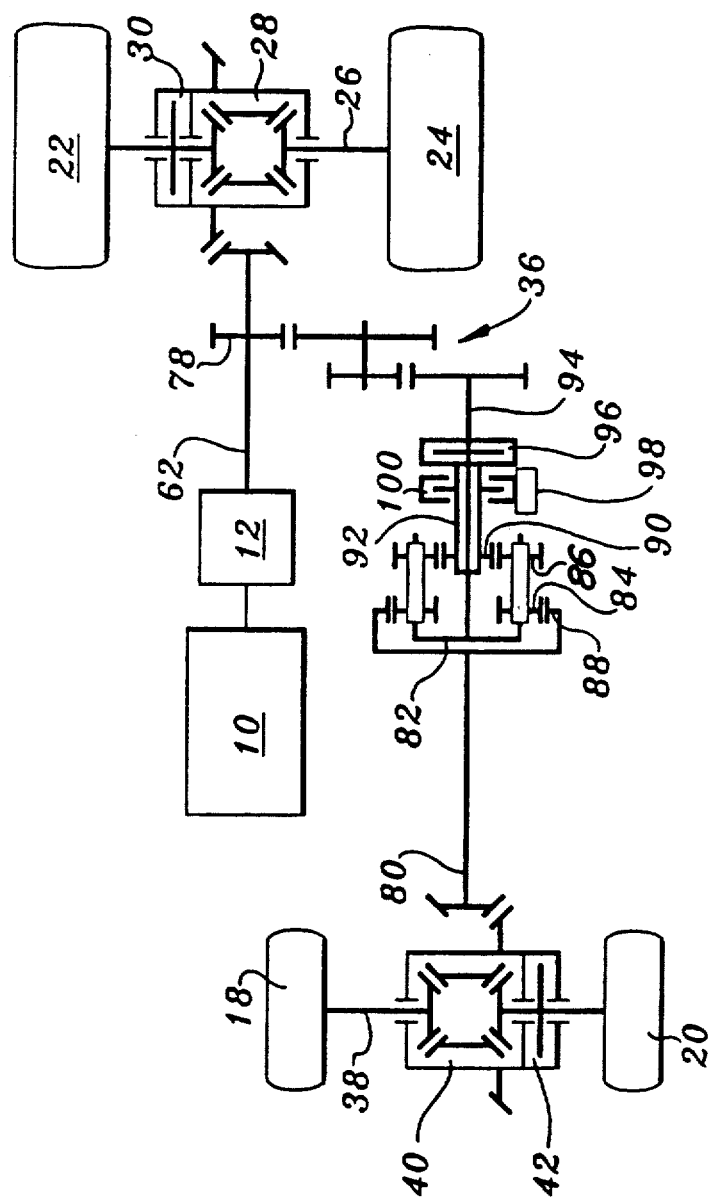
FIG. 2 is a schematic diagram of a power distribution and control system with a two-speed transmission gearbox for the front axle.

The drive control system of FIG. 2 differs from that of FIG. 1, in that it does not include a center differential gear that divides the output torque between two axles. In the system of FIG. 2 the output gear 78 is attached directly to the gearbox output shaft 62. The intermediate gears 36 drive the planet carrier 82 of a planetary gearbox and which carries two sets of planet pinions 84, 86. The first set of planet pinions 84 meshes with an internal gear 88 which is connected to the front drive shaft 80. The second set of planet pinions 86 meshes with its sun gear 90 which is mounted on the hollow shaft 92.

A clutch 96 is arranged between this hollow shaft 92 and the output shaft 94 of the intermediate gears 36. When the clutch 96 is engaged the planetary gearbox is inoperative and the rotational speed of the output shaft 94 is transmitted directly to the front drive shaft 80. If, on the other hand, the clutch is disengaged, no torque is transmitted from the output shaft 94 to the front drive shaft 80.

Furthermore, a brake 100 is arranged between the hollow shaft 92 and the gearbox housing 98. When the brake 100 is applied, the sun gear 90 is stopped and the rotational speed of the output shaft 94 is increased by the planetary gearbox and transmitted to the front drive shaft.

The center differential gear varies the rotational speed of front and rear axle continuously and in opposite directions. The planetary gearbox of FIG. 2 with the clutch 96 and the brake 100 generally has three specific shift positions or conditions:

First, a condition wherein the front wheel drive is not engaged (the brake is released and the clutch is disengaged);

Second, condition wherein the front wheel drive is engaged without rotational speed increase (the brake is released and the clutch is engaged); and Third, a condition wherein the front wheel drive is engaged with rotational speed increase (the brake is applied and the clutch is disengaged).

These shift positions are controlled by the control system 34 (best seen in FIG. 1). When the steering angle exceeds a predetermined value, for example, 25°.

The center differential gear operates without any steps, while the drive arrangement shown of FIG. 2 operates in well-defined steps. Additional differential action can be generated by a controlled pressure or slip at the brake 100.

Figure 3:
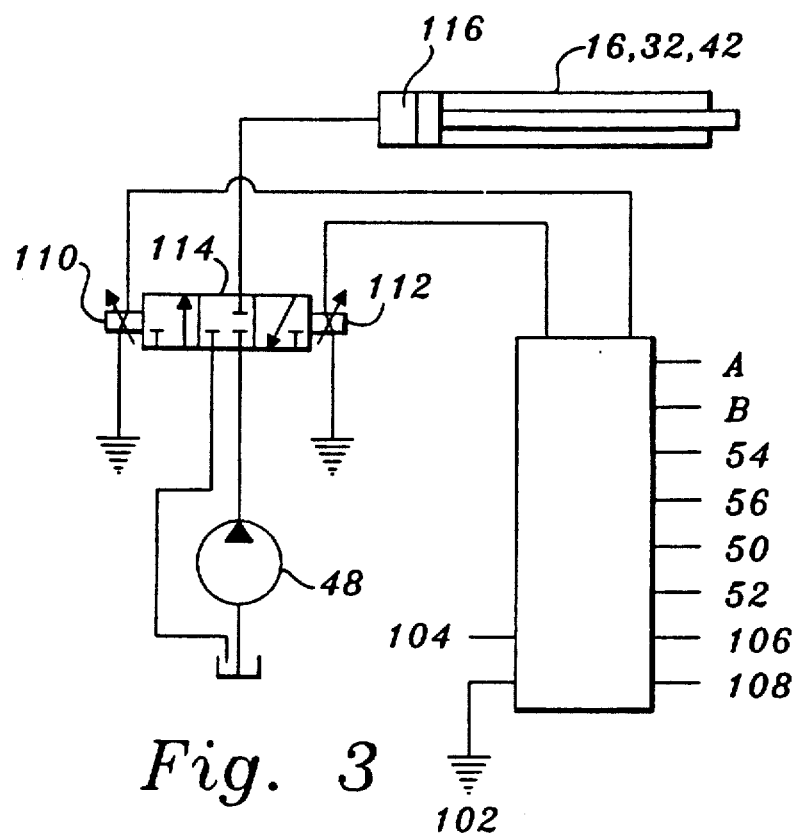
FIG. 3 is a schematic diagram of a control valve arrangement for use in connection with the present invention.
Figure 4:
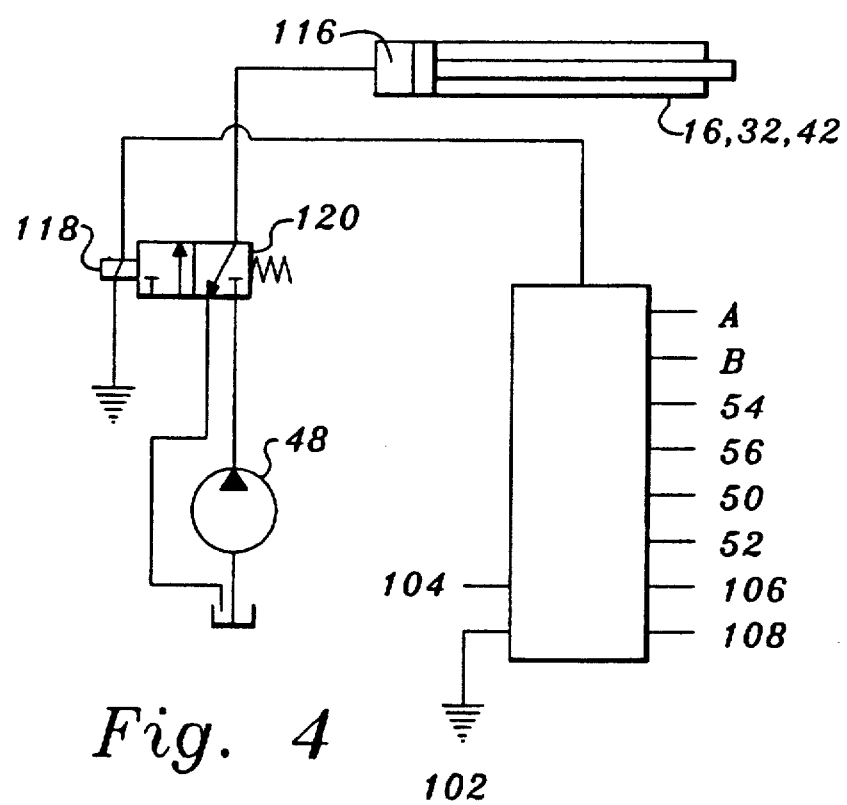
FIG. 4 is a schematic diagram of an alternate control valve arrangement for use in connection with the present invention.

FIG. 3 illustrates a preferred control valve system for controlling the clutches 16, 30 and 42. Power is supplied to the control system 34 through a ground connection 102 and a connection 104 carrying a voltage. It receives signals from the two steering angle sensors, from the front wheel rotational speeds 54 and 56, from the rear wheel rotational speeds 50 and 52, from a brake actuation switch or brake sensor 106 and from temperature sensors 108 that monitor the temperatures of the clutches 16, 30 and 42. The control system 34 generates control signals from the algorithm according to the invention and transmits these to the coils 110, 112 of an electro-magnetically operated three-way proportional valve 114. This valve 114 may be one of the valves 32, 44, 46. The electro-magnetic control of the valve 114 shown may also be performed by an electro-motor control by a servo motor or by other means.

The three-way proportional valve 114 is located between the hydraulic pump 48 and the hydraulic cylinder 116 of the clutch 16, 30 or 42. Displacing the valve 114 from its neutral central position permits the pressure in the hydraulic cylinder 116 to be raised or lowered whereby the clutch 16, 30 or 42 is engaged to a greater or lesser degree.

An alternative is illustrated in FIG. 2, in which the three-way proportional valve is replaced by a two-way valve 120 controlled electro-magnetically by an electro-magnetic coil 118. This two-way valve 120 can be switched periodically between the positions for lowering the pressure and increasing the pressure by the control system 34 at a fixed fundamental frequency. Here the duration of the open and closed phases is controlled by the control system 34 to correspond with the algorithm according to the invention.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

Mode of Operation

The sensed steering angle values are used by the control system 35 to determine a theoretical rotational speed difference ratio for conditions of rolling without any slip and determines an actual rotational speed difference ratio from the sensed rotational speeds. The rotational speed difference ratios are defined as the absolute value of the difference of the circumferential speeds of the two wheels on one axle divided by the mean value of the circumferential speeds of the two wheels of one axle.

The control system 35 compares the actual with the theoretical rotational speed difference ratio in predetermined time intervals and transmits control signals to the axle differential lock 42. The control signals increase the degree of locking the axle differential lock 42 when the actual rotational speed difference ratio $SDR_{act}$ is greater than the theoretical rotational speed difference ratio $SDR_{req}$, and reduce the degree of locking when the actual rotational speed difference ratio $SDR_{act}$ is smaller than the theoretical rotational speed difference ratio $SDR_{req}$. This means that when an excessively high rotational speed difference between the two wheels of one axle is encountered, it is reduced by braking the differential action and that when too small a rotational speed difference is found, the rotational speed is equalized by increasing the differential action.

The theoretical circumferential speeds can be derived from the vehicle geometry and the steering can be derived rolling of the wheels without any slip. In a typical Ackerman type steering mechanism, the wheel centerlines of the front and the rear wheels may meet at a point on the extension of the centerline of the rear axle, as long as alignment errors are disregarded. In actual operation the performance of the vehicle deviates more or less from the theoretical ideal condition due to weather conditions, road conditions, loading of the vehicle, tire pressures, vehicle speeds, operation around curves and abrupt driving maneuvers, etc. Since the operator can control the vehicle essentially with the steering wheel, which responds directly to the actions of the operator as well as the reaction of the vehicle, the steering angle is a key parameter for the steering process.

The control system calculates the theoretical rotational speed difference ratio from the absolute value of the effective rolling radii $R_l$ and $R_r$ of the wheel divided by the rolling radius $R_m$ of a mean equivalent wheel according to the following relationship, $SDR_{req} = |R_l - R_r| \div R_m$.

Thereby the mean equivalent wheel may be defined by the Ackermann conditions. The aforementioned radii can be derived for each given vehicle geometry from simple geometric relationships from the measured values of the steering angles.

The control system 35 calculates from the sensed steering angle values a radius ratio that consists of the rolling radius of a mean equivalent wheel of the steerable axle 38 divided by the rolling radius of a mean equivalent wheel of the rigid or non-steerable axle 50. The control system also derives from the sensed rotational speeds of the wheels for each axle a mean rotational speed, and calculates a speed ratio from the mean rotational speed of the steerable axle 38 divided by the mean rotational speed of the rigid axle 50. As long as the rotational speed ratio is greater than the radius ratio, the control system 35 transmits control signals to the center differential lock 16 which increased the degree of locking of the center differential gear 14. Once the rotational speed ratio becomes smaller than the radius ratio, the degree of locking of the center differential gear 14 is reduced. This means that when the wheels of one axle slip, the center differential gear 14 is locked to a greater degree. If, on the other hand, the wheels of one of the axles operate synchronously the differential action is increased.

Since the wheels of the steerable axle 38 exhibit a higher circumferential speed in operation around curves than the speed of the wheels of the rigid axle 50, the preferred embodiment of the invention increases the rotational speed of the wheels of the steerable axle 38 in proportion to the steering angle. This is accomplished by dividing the gearbox output power between the rigid axle 50 and the steerable axle 38 by means of the center differential gear 14 in proportion to the steering angle in such a way that an automatic increase in the rotational speed of the wheels of the steerable axle 38 as compared to the rotational speed of the wheels of the rigid axle 50 is produced during operation around curves.

The increase in rotational speed is achieved by the Ravigneaux gear-set contained in the center differential gear 14 through which the gearbox output torque is divided between the drives to the steerable axle 38 and the rigid axle 50 in proportion to the radii of the two sun gears of the Ravigneaux gear-set. To avoid repetition, U.S. copending patent application Ser. No. 07/929,645 filed 12 Aug. 1992, is hereby incorporated by reference.

I claim:

1. A control system for controlling and distributing power to wheels of a motor vehicle having a driven steerable and a driven non-steerable axle, each axle having left and right wheels, at least one of said axles having an axle differential, at least one steering angle sensor for generating a steering angle value representing a steering angle of at least one of the wheels, rotational speed sensor to sense rotational speeds of the left and right wheels of at the least on of the axles, the control system characterized by:

an axle differential lock for the axle differential of the at least one axle, the axle differential lock being controlled by the control system;

means for calculating from the steering angle value for conditions of rolling without slip a theoretical rotational speed difference ratio $SDR_{req}$ and from the measured values of the rotational speed sensors an actual rotational speed difference ratio, $SDR_{act}$, according to the equation $SDR_{act} = \{|v_l - v_r|\} \div v_m$, where $v_l$ and $v_r$ are the rotational speeds of the left and right wheels and $v_m$ is the means rotational speed of the left and right wheels;

means for comparing the theoretical and actual rotational speed difference ratios with each other in predetermined time intervals and transmitting control signals to the axle differential lock to increase a degree of locking of the axle differential when the actual rotational speed difference ratio $SDR_{act}$ is greater than the theoretical rotational speed difference ratio $SDR_{req}$ and to decrease the degree of locking of the axle differential when the actual rotational speed difference $SDR_{act}$ is smaller than the theoretical rotational speed difference ratio $SDR_{req}$.

2. The control system of claim 1, further comprising:

means for calculating the theoretical rotational speed difference ratio $SDR_{req}$ according to the relationship, $SDR_{req}=(|R_l-R_r|)\div R_m$, where $R_l$ and $R_r$ are the rolling radii of the left and the right wheels and $R_m$ is the rolling radius of a means equivalent wheel.

3. The control system of claim 1, characterized by:

a center differential coupled between the axles;

means for calculating a radius ratio of a rolling radius of a means equivalent wheel of the steerable axle from the steering angle value;

means for calculating a rolling radius of a mean equivalent wheel of the non-steerable axle from the steering angle value;

means for calculating a mean rotational speed from the sensed rotational speeds of the wheels for each axle;

means for calculating a rotational speed ratio from a mean rotational speed of the steerable axle and from the mean rotational speed of the non-steerable axle; and means for transmitting control signals to the center differential to control the operation thereof as a function of the rotational speed ratio.

4. The control system of claim 3, wherein:

the center differential further comprises a center differential lock coupled between the driven steerable axle and the driven non-steerable axle; and the control signals operate to increase the degree of locking of the center differential as long as the rotational speed ratio is greater than the radius ratio, and operate to decrease the degree of locking of the center differential as long as the rotational speed ratio is smaller than the radius ratio.

5. The control system of claim 1, wherein:

the at least one axle differential lock comprises hydraulically controlled clutches which increase the degree of locking with increasing hydraulic pressure.

6. The control system of claim 4, wherein:

the center differential divides power distribution between the steerable axle and the non-steerable axle depending upon the steering angle.

7. The control system of claim 4, wherein:

the center differential gear comprises a Ravigneaux gear-set through which output torque is divided between the steerable axle and the non-steerable axle as a function of a ratio of the radii of a pair of sun gears of the Ravigneaux gear-set.

8. The control system of claim 4, wherein the control system comprises:

an electronic control unit;

a hydraulic circuit; and means for locking the center differential gear in response to a failure of the electronic control and in response to a failure of the hydraulic circuit.

* * * * *

UNITED STATES PATENT AND TRADEMARK OFFICE
CERTIFICATE OF CORRECTION

PATENT NO. : 5,301,769
DATED : April 12, 1994
INVENTOR(S) : Heinz Weiss

It is certified that error appears in the above-indentified patent and that said Letters Patent is hereby corrected as shown below:

In Col. 8, line 40, delete "on" and insert -- one --.

Signed and Sealed this

Twenty-third Day of August, 1994

Attest:

BRUCE LEHMAN

Attesting Officer     Commissioner of Patents and Trademarks